US012335810B2

(12) United States Patent
LaPenna et al.

(10) Patent No.: US 12,335,810 B2
(45) Date of Patent: *Jun. 17, 2025

(54) SYSTEM AND METHOD FOR REQUESTING AN UPDATED USER LOCATION

(71) Applicant: Google LLC, Mountain View, CA (US)

(72) Inventors: Joseph LaPenna, San Francisco, CA (US); Chris Lambert, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,612

(22) Filed: Oct. 12, 2023

(65) Prior Publication Data

US 2024/0155306 A1 May 9, 2024

Related U.S. Application Data

(63) Continuation of application No. 17/585,079, filed on Jan. 26, 2022, now Pat. No. 11,825,378, which is a continuation of application No. 16/680,660, filed on Nov. 12, 2019, now Pat. No. 11,265,676, which is a continuation of application No. 15/854,081, filed on Dec. 26, 2017, now Pat. No. 10,484,821, which is a continuation of application No. 15/137,828, filed on Apr. 25, 2016, now Pat. No. 9,872,143, which is a continuation of application No. 13/409,063, filed on Feb. 29, 2012, now Pat. No. 9,325,797.

(51) Int. Cl.
*H04W 4/23* (2018.01)
*G06F 3/04842* (2022.01)
*H04L 67/50* (2022.01)
*H04L 67/52* (2022.01)
*H04W 4/02* (2018.01)

(52) U.S. Cl.
CPC ........ *H04W 4/023* (2013.01); *G06F 3/04842* (2013.01); *H04L 67/52* (2022.05); *H04L 67/535* (2022.05)

(58) Field of Classification Search
CPC ....... H04L 67/52; H04L 67/535; H04W 4/023
USPC ... 455/456.3, 418, 456.1, 414.2, 405, 422.1, 455/433
See application file for complete search history.

(56) References Cited

U.S. PATENT DOCUMENTS

| | | |
|---|---|---|
| 6,278,402 B1 | 8/2001 | Pippin |
| 7,496,444 B1 | 2/2009 | Fried |
| 7,529,850 B2 | 5/2009 | Verma et al. |
| 7,925,515 B2 | 4/2011 | Xu et al. |
| 8,265,862 B1 * | 9/2012 | Zilka ................. G01C 21/3688 455/457 |

(Continued)

*Primary Examiner* — Joseph Arevalo
(74) *Attorney, Agent, or Firm* — DORITY & MANNING P.A.

(57) ABSTRACT

A system and method is disclosed for requesting an updated location, including a point of interest, from a user for display on an interactive map. On receiving from an interested user a request for a point of interest associated with a subscribed user's current location, a request is transmitted to the subscribed user to check-in to the point of interest. In response to the request, the subscribed user selects a selected point of interest from a selection list. A representation of the subscribed user and the selected point of interest is then provided for display on an interactive map associated with the interested user.

19 Claims, 4 Drawing Sheets

(56) References Cited

U.S. PATENT DOCUMENTS

| | | |
|---|---|---|
| 8,645,366 B1 | 2/2014 | Acharya |
| 9,578,088 B2 | 2/2017 | Nickolov et al. |
| 9,778,062 B2 | 10/2017 | Zubas et al. |
| 9,894,669 B2 | 2/2018 | Sevindik |
| 2002/0027524 A1 | 3/2002 | Pippin |
| 2004/0030756 A1 | 2/2004 | Matsuyama et al. |
| 2004/0054428 A1 | 3/2004 | Sheha et al. |
| 2004/0111360 A1 | 6/2004 | Albanese |
| 2004/0204822 A1 | 10/2004 | Kohno et al. |
| 2006/0034367 A1 | 2/2006 | Park |
| 2007/0233385 A1 | 10/2007 | Dicke et al. |
| 2008/0076451 A1* | 3/2008 | Sheha ............... G01C 21/3679 455/456.3 |
| 2009/0005021 A1 | 1/2009 | Forstall et al. |
| 2009/0024476 A1 | 1/2009 | Baar et al. |
| 2009/0033552 A1 | 2/2009 | Kirmuss et al. |
| 2009/0198767 A1 | 8/2009 | Jakobson et al. |
| 2010/0146436 A1 | 6/2010 | Jackobson et al. |
| 2010/0174709 A1 | 7/2010 | Hansen et al. |
| 2010/0197318 A1 | 8/2010 | Petersen et al. |
| 2010/0257234 A1 | 10/2010 | Caughey |
| 2011/0015858 A1 | 1/2011 | Takagi et al. |
| 2011/0045761 A1* | 2/2011 | Rolf ....................... H04W 4/02 455/3.06 |
| 2011/0046881 A1 | 2/2011 | Karaoguz |
| 2011/0071757 A1 | 3/2011 | Lee et al. |
| 2011/0098918 A1 | 4/2011 | Sikiski et al. |
| 2011/0106441 A1 | 5/2011 | Robinson |
| 2011/0161003 A1 | 6/2011 | Fukuda et al. |
| 2011/0201317 A1 | 8/2011 | Karandikar et al. |
| 2011/0313657 A1 | 12/2011 | Myllymaki et al. |
| 2012/0075338 A1 | 3/2012 | Curtis et al. |
| 2012/0079018 A1 | 3/2012 | Rottler et al. |
| 2012/0096490 A1 | 4/2012 | Barnes, Jr. |
| 2012/0101722 A1 | 4/2012 | Inami et al. |
| 2012/0131510 A1 | 5/2012 | Forstall et al. |
| 2012/0154446 A1 | 6/2012 | Adams et al. |
| 2012/0200743 A1 | 8/2012 | Blanchflower et al. |
| 2012/0203799 A1 | 8/2012 | Blanchflower et al. |
| 2012/0209826 A1 | 8/2012 | Belimpasakis |
| 2012/0212405 A1 | 8/2012 | Newhouse et al. |
| 2012/0274445 A1 | 11/2012 | Chin et al. |
| 2012/0329481 A1 | 12/2012 | Malkin et al. |
| 2013/0065613 A1 | 3/2013 | Stopel et al. |
| 2013/0073400 A1 | 3/2013 | Heath |
| 2013/0124080 A1 | 5/2013 | Diao et al. |
| 2013/0166386 A1 | 6/2013 | Simmons |
| 2013/0197796 A1 | 8/2013 | Obradovich et al. |
| 2013/0201214 A1 | 8/2013 | Piippo et al. |
| 2013/0275040 A1 | 10/2013 | Dicke et al. |
| 2013/0321402 A1 | 12/2013 | Moore et al. |
| 2013/0326380 A1 | 12/2013 | Lai et al. |
| 2013/0326407 A1 | 12/2013 | van Os et al. |
| 2014/0006129 A1 | 1/2014 | Heath |
| 2014/0108383 A1 | 4/2014 | Chan et al. |
| 2014/0141813 A1 | 5/2014 | Johnson |
| 2014/0213304 A1 | 7/2014 | Beckett et al. |
| 2016/0309303 A1 | 10/2016 | Svener et al. |
| 2016/0364740 A1 | 12/2016 | Parker |

* cited by examiner

SYSTEM AND METHOD FOR REQUESTING AN UPDATED USER LOCATION

TECHNICAL FIELD

The subject technology relates generally to social networks, and, in particular, determining the current location of a user in a social network.

BACKGROUND

GPS-enabled cell phones have been integrated with interactive maps to provide subscribed users the ability to view their locations, and the locations of their friends, on interactive maps. In this manner, a user may load a map on a cell phone to view the location(s) of the user's friends in real time. GPS-enabled cell phones may also been integrated with a "check-in" feature that enables a user to select, in real-time, a location near the user's current GPS location that the user wishes to announce to other users (for example, in a social network) where the user is located.

SUMMARY

The subject technology provides a system and computer-implemented method for requesting an updated location, including a point of interest, from a user for display on an interactive map. According to one aspect, the method includes receiving, from an interested user, a request for an identifiable point of interest corresponding to a subscribed user's current location, transmitting to the subscribed user the request, receiving from the subscribed user a selected point of interest, and providing for display on an interactive map associated with the interested user, a representation of the subscribed user and the selected point of interest. In another aspect, the method may be performed by instructions stored on a machine-readable medium. In this regard, the instructions, when executed, may perform a method including sending to a subscribed user a request for an identifiable point of interest corresponding to the subscribed user's current location, receiving, in response to the request, a point of interest associated with the subscribed user, and providing, for display at a user interface associated with one or more interested users, a representation of the subscribed user and the received point of interest.

In other aspects, a system includes a processor and a memory, the memory including instructions that, when, cause the processor to receive a request for a point of interest related to a subscribed user's current location, transmit to a first computing device associated with the subscribed user a request to check-in to a point of interest, receive from the first computing device a selected point of interest, the selected point of interest being selected from a list of locations determined to be proximate to a geographic location of the subscribed user, and provide for display at a second computing device associated with an interested user, a representation of the subscribed user and the selected point of interest.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
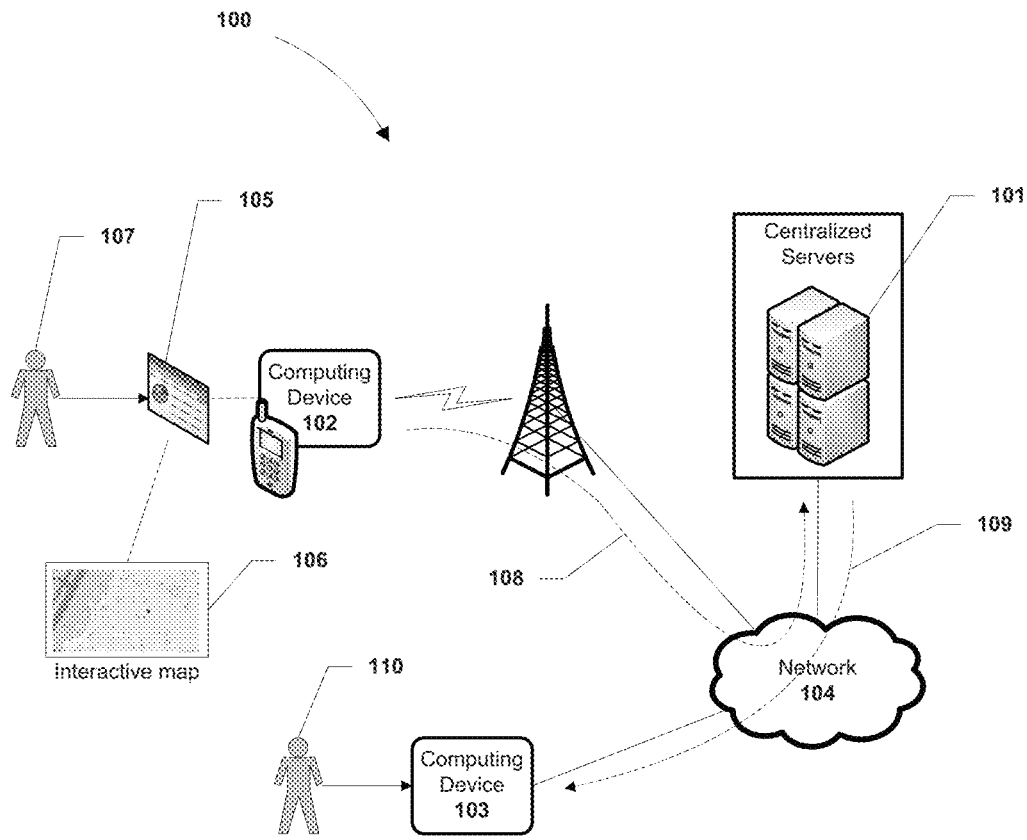
FIG. 1 is a diagram of an example system for requesting a user to provide a point of interest corresponding to the user's current location according to one aspect of the subject technology.

FIG. 1 is a diagram of an example system 100 for requesting a user to provide a point of interest corresponding to the user's current location according to one aspect of the subject technology. System 100 may include one or more centralized servers 101 and one or more geographically aware computing devices (for example, a smart phone, tablet or notebook computer, personal computer, PDA, a television or other display device with one or more location-aware computing devices embedded therein or attached thereto, or the like), including a first computing device 102 and a second computing device 103. Centralized servers 101 may be responsible for hosting a social network, including hosting message boards and forum discussions and the like, and for the sending and receiving of electronic messages to and from computing devices 101 and 102 over a network 104 (for example, a LAN, WAN, WiFi, cellular network, or the Internet).

Centralized servers 101 may be configured to provide one or more application programming interfaces (APIs) for the integration of mobile-to-web extension applications. For example, a social network hosted by centralized servers 101 may include a social check-in application that allows users of the social network to "check in" to a physical place using a geographically aware computing device, and share their location with their friends or contacts. The geographically aware computing device may be configured with software integrated with the social network and configured to perform a check-in by associating the user's current geographic location with one or more identifiable points of interest (for example, places, businesses or recreational areas, or the like), and enabling the user to provide the one or more identifiable points of interest to one or more other users. The software may, for example, use a GPS device integrated into the computing device to find the user's current location, and then present to the user for selection a list of points of interest based on the current location. When a point of interest is selected, the computing device may send a message (for example, over network 104) to centralized servers 101 to supplement the user's current geographic location displayed in the social network with the selected point of interest.

In one aspect, centralized servers 101 may be configured to provide for display a graphical user interface 105 (for example, a web page), including an interactive map 106 to computing devices 101 and/or 102. Interactive map 106 may display the current locations of users who have performed a "check-in" using their computing device. In the depicted example, a first computing device 102 (for example, a GPS-enabled smart phone) may be integrated with a check-in feature that enables a first user 107 to send a first signal 108 (for example, an indication, announcement, message, or the like) to centralized servers 101, informing centralized servers 109 that first user 107 is at a point of interest (for example, a business establishment at or near the first user's current geographic location). On receiving first signal 108, centralized servers 101 may send a second signal 109 (for example, an indication, announcement, message, or the like) to one or more second users 110 (for example, contacts of user 105 in a social network who are also using similarly configured computing device 103), informing the one or more second users 110 that first user 105 is at the point of interest. Signal 109 may include, for example, generating a representation of first user 106 along with information about the point of interest on the previously described interactive map.

In another example, first computing device 102 may be integrated with software that provides a graphical user interface 105 configured to display to a first user 107 a group (for example, a list) of one or more second users 110. The group of second users 110 may be subscribed to the social network and/or designated or contacts of first user 107, or users of the social network who can view or receive messages from first user 107. On selection of a second user 110, first computing device 102 may send a first signal 108 (for example, an indication, announcement, message, request or the like) to centralized server 101 representative of a request for a point of interest corresponding to second user's 110 current geographic location. On receiving first signal 108, centralized server 101 may send a second signal 109 (for example, an indication, announcement, message, request or the like) to second computing device 103 representative of a request for second user 110 to check-in to a point of interest. Second user 110 may then perform a check-in to a point of interest in the previously described manner.

Figure 2:
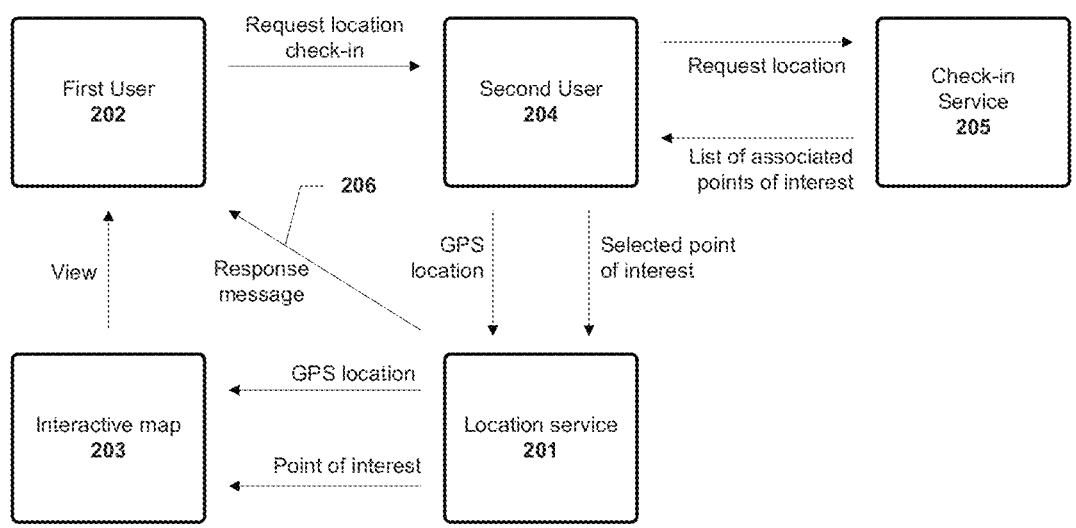
FIG. 2 is a state diagram of an example system for requesting a user to provide a point of interest corresponding to the user's current location according to one aspect of the subject technology.

FIG. 2 is a state diagram of an example system for requesting a user to provide a point of interest corresponding to the user's current location according to one aspect of the subject technology. A location service 201 may be provided by a server (for example, a centralized server 101) to subscribed users of a group or social network for interactively locating other users in the group or social network. Through location service 201, a first user 202 may view, on an interactive map 203, the geographic location of a second subscribed user 204. In one aspect, a geographically aware computing device associated with second user 204 (for example, computing device 102) may be configured by user 204 to broadcast its geographic location to the server associated with location service 201. For example, the computing device may provide GPS position information, latitude and longitude coordinates, altitude information, cartography data, or the like. In some aspects, the geographic location may be broadcast or updated periodically at predetermined intervals (for example, every 5 minutes). The geographic location may be received by location service 201 and provided to interactive map 203 for display to first user 202.

While a geographic location of second user 204 may be viewable on interactive map 203, a point of interest (for example, a place of business, recreational area, or the like) corresponding to the geographic location of second user 204 may not be readily perceivable. Interactive map 203 may be configured to display one or more selectable graphic representations of second user 204 at a location on interactive map 203 corresponding to the actual geographic location of second user 204. On selecting a representation of second user 204 (for example, by a click of a mouse), first user 202 may request that second user 204 perform a "check-in" action at the second user's current location. Second user 204 may receive a message on his or her computing device, for example, stating first user 202 "wants to know where you are at." Automatically, or upon initiation by second user 204 (for example, on selecting a graphical confirmation button), a computing device associated with second user 204 may provide its current geographic location to a check-in service 205 (for example, using software executed by the device or integrated with the user's social network).

Check-in service 205 may present second user 204 with a list of points of interest (for example, businesses or public recreational areas) proximate to the current geographic location of second user 204. Second user 204 may then select from the list the point of interest he or she is currently visiting, and location service 201 is updated with details about the visited point of interest. In one aspect, the computing device associated with second user 204 provides location service 201 with the selected point of interest. In another aspect, check-in service 205 may be in communication or integrated with location service 201 (for example, via a social network), and provide location service 201 with the selected point of interest. Location service 201 may then send a message 206 to first user 202, informing first user 202 of the selected point of interest. To this end, neither user needs to be aware of the other user's phone number, email address, or other contact information, or spend any effort to contact the other user to request or receive the point of interest.

In another aspect, on discovering a user's geographic location or selected point of interest, location service 201 may automatically perform an internet search to retrieve supplemental details about the geographic location or selected point of interest, and then display those details, in addition to user-specific details, to first user 202. In a further aspect, the location service 201 may provide selectable details about the geographic location or selected point of interest to second user 204 to include in message 206 sent to first user 202. For example, if second user 204 has checked-in to a movie theater, a list of movies may be displayed so that second user 204 may select the movie that he or she is currently watching. If second user 204 is at a bar, second user 204 may be presented with a list of drinks offered at the bar, and may select what type of drink (for example, Guinness on tap) he or she is consuming.

In other aspects, a point of interest selected by second user 204 may also be broadcast to one or more other interested recipients. In this regard, the location service 201 may determine that one or more third users may be interested in the second user's location at the time of the check-in action. Who receives the broadcast may be based on, for example, a determination that the one or more third users belong to a group in common with first user 202 and/or second user 204 (for example, they are friends), that they regularly frequent the place of check-in (for example, they have checked-in to the place at least a predetermined number of times within the last 30 days), and/or the like. In another example, the geographic location or selected point of interest may be broadcast to the one or more third users if second user 204 has travelled outside a predetermined area (for example, determined by user 202 or by a mean and standard deviation of geographic locations visited by second user 204), or user 202 is in an unexpected location (for example, the user is in NY rather than California).

Figure 3:
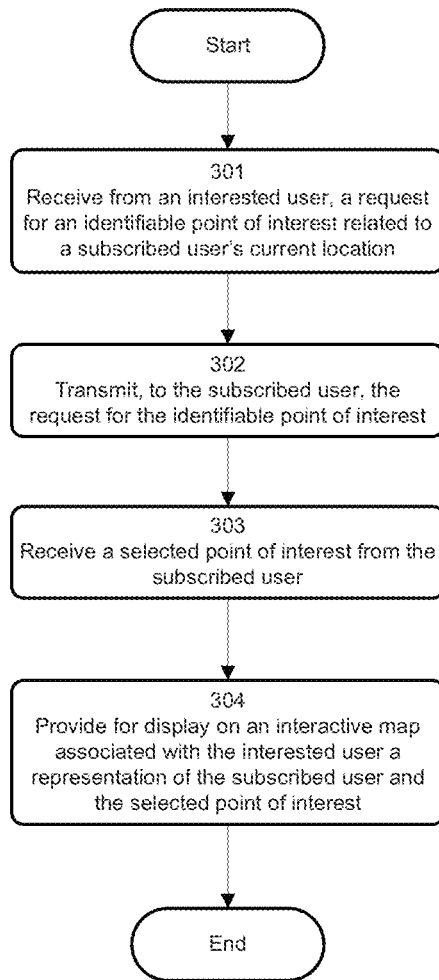
FIG. 3 is a flowchart illustrating an example process or requesting an updated location from a user for display on an interactive map according to one aspect of the subject technology.

FIG. 3 is a flowchart illustrating an example process or requesting an updated location from a user for display on an interactive map according to one aspect of the subject technology. According to one aspect, a social network (including, for example, one or more centralized servers 101) may be integrated with a check-in service to recognize when a user subscribed to the social network is at a business establishment. In a first step 301, a request for an identifiable point of interest related to a subscribed user's current location is received from an interested user. In a second step 302, the request for the identifiable point of interest is transmitted to the subscribed user. In a third step 303, a selected point of interest is received from the subscribed user. In a fourth step 304, a representation of the subscribed user and the selected point of interest is provided for display on an interactive map associated with the interested user.

Figure 4:
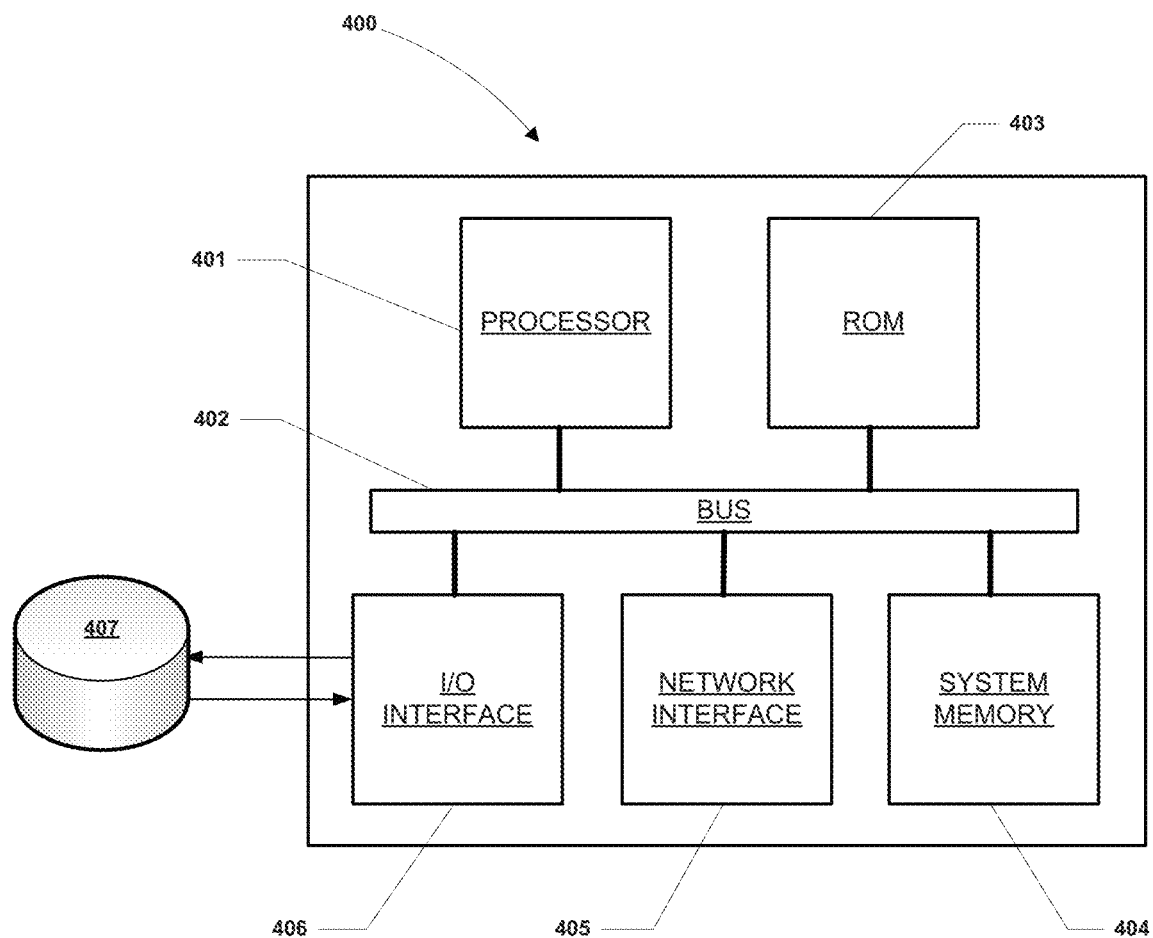
FIG. 4 is a diagram illustrating an example machine or computer for requesting a user to provide a point of interest corresponding to the user's current location, including a processor and other internal components, according to one aspect of the subject technology.

FIG. 4 is a diagram illustrating an example machine or computer for requesting a user to provide a point of interest corresponding to the user's current location, including a processor and other internal components, according to one aspect of the subject technology. In some aspects, a computerized device 400 (for example, server 101, computing device 102 or 103, or the like) includes several internal components such as a processor 401, a system bus 402, read-only memory 403, system memory 404, network interface 405, I/O interface 406, and the like. In one aspect, processor 401 may also be in communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a web site, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A non-transitory machine-readable media including instructions that, when executed, perform a method for requesting a second user to provide a current location, the method comprising:
    receiving, from a first computing system associated with a first user, a location request, wherein the location request including an identifier for a second user and location data for a point of interest;
    sending the location request to a second computing system associated with a second user;
    receiving, in response to the location request, location data from the second computing system;
    determining that the location data from the second computing system matches the location data for the point of interest;
    receiving an approval response of the location request from the second user for the point of interest; and
    responsive to determining that the location data from the second computing system matches the location data for the point of interest, providing, for display at a user interface of the first computing system, a representation of the second user and the point of interest.

2. The non-transitory machine-readable media of claim 1, further comprising:
    providing, for display at the user interface of the first computing system, a selectable list of users, wherein the request is received in response to receiving, at the user interface, a selection corresponding to one of the listed users.

3. The non-transitory machine-readable media of claim 1, wherein providing, for display at the user interface of the first computing system, representation of the second user and the point of interest includes:
    providing the representation of the second user and the point of interest for display on an interactive map associated with the first user.

4. The non-transitory machine-readable media of claim 3, the method further comprising:
    receiving the request in response to receiving at the interactive map a selection corresponding to the second user.

5. The non-transitory machine-readable media of claim 1, wherein the point of interest is selected from a list of locations proximate to a current geographic location of the second user.

6. The non-transitory machine-readable media of claim 1, the method further comprising:
    on receiving selection of the point of interest, performing a search to retrieve supplemental details about the point of interest; and
    providing the supplemental details for display at the user interface.

7. The non-transitory machine-readable media of claim 1, the method further comprising:

providing for display at the user interface, a list of related details related to the point of interest;

receiving a selection corresponding to a selected one of the related details; and providing the selected one of the related details for display at the user interface.

8. The non-transitory machine-readable media of claim 1, the method further comprising:

determining the first user is in a group in common with the second user before providing the representation and the received point of interest for display at the user interface.

9. The non-transitory machine-readable media of claim 1, the method further comprising:

determining that the first user regularly frequents the point of interest before providing the representation of the second user and the point of interest for display at the user interface.

10. The non-transitory machine-readable media of claim 9, wherein determining that the first user regularly frequents the received point of interest includes determining that the first user has performed a checked-in at the point of interest more than a predetermined number of times over a predetermined period.

11. The non-transitory machine-readable media of claim 1, the method further comprising:

determining that the second user has travelled outside a predetermined area before sending the location request to the second user.

12. A method for requesting an updated location from a user for display on an interactive map, the method comprising:

receiving, from a first computing system associated with a first user, a location request, the location request including an identifier for a second user and location data for a point of interest;

transmitting the location request to a second computing system associated with a second;

receiving, in response to the location request, location data from the second computing system;

determining that the location data from the second computing system matches the location data for the point of interest; and responsive to determining that the location data from the second computing system matches the location data for the point of interest, receiving an approval response of the location request from the second user for the point of interest, providing for display on an interactive map at the first computing system, a representation of the second user and the point of interest.

13. The method of claim 12, further comprising:

providing for display, at a user interface associated with the first computing system, a selectable list of users, wherein the location request is received in response to receiving, at the user interface, a selection corresponding to one of the listed users.

14. The method of claim 12, wherein the request is received in response to receiving, at the interactive map, a selection corresponding to the second user.

15. The method of claim 12, further comprising:

on receiving selection of the point of interest, performing a search to retrieve supplemental details about the point of interest, and providing the supplemental details for display in connection with the interactive map.

16. The method of claim 12, further comprising:

providing a list of supplemental details associated the selected point of interest;

receiving a selection corresponding to one of the supplemental details; and providing the selected one of the supplemental details for display in connection with the interactive map.

17. The method of claim 12, further comprising:

determining that one or more other users may be interested in a second user's current location; and providing for display on an interactive map associated with the one or more other users, the representation of the second user and the point of interest.

18. The method of claim 17, wherein determining that one or more other users may be interested in the second user's current location includes:

determining that the one or more other users belong to a group in common with the second user.

19. The method of claim 17, wherein determining that one or more other users may be interested in the second user's current location includes:

determining that the one or more other users regularly frequent the point of interest.

* * * * *